US009139317B2

(12) United States Patent
Gess

(10) Patent No.: US 9,139,317 B2
(45) Date of Patent: Sep. 22, 2015

(54) METHOD AND APPARATUS FOR OPENING BAGS WHILE MAINTAINING A CONTINUOUS STRIP OF BAG PRECURSORS

(71) Applicant: Larry C. Gess, Palmyra, WI (US)

(72) Inventor: Larry C. Gess, Palmyra, WI (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 0 days.

(21) Appl. No.: 14/530,570

(22) Filed: Oct. 31, 2014

(65) Prior Publication Data

US 2015/0047300 A1 Feb. 19, 2015

Related U.S. Application Data

(63) Continuation-in-part of application No. 13/963,431, filed on Aug. 9, 2013, now Pat. No. 8,904,740.

(60) Provisional application No. 61/691,288, filed on Aug. 21, 2012.

(51) Int. Cl.
*B65B 69/00* (2006.01)
*B65B 43/26* (2006.01)
(Continued)

(52) U.S. Cl.
CPC ............... *B65B 43/267* (2013.01); *B31B 1/00* (2013.01); *B32B 1/00* (2013.01); *B65B 57/02* (2013.01); *B31B 23/00* (2013.01); *B31B 2219/14* (2013.01); *B31B 2219/28* (2013.01);
(Continued)

(58) Field of Classification Search
CPC  B31B 23/00; B31B 2237/10; B31B 2237/60; B65B 69/0033; B65B 69/00; B65B 69/0025
See application file for complete search history.

(56) References Cited

U.S. PATENT DOCUMENTS

| | | | |
|---|---|---|---|
| 3,430,409 | A | 3/1969 | Manfredonia et al. |
| 3,754,370 | A | 8/1973 | Hanson |

(Continued)

FOREIGN PATENT DOCUMENTS

| | | |
|---|---|---|
| CA | 1052605 | 4/1979 |
| EP | 0072086 | 2/1983 |

(Continued)

OTHER PUBLICATIONS

International Search Report and Written Opinion, International Application No. PCT/US2013/054336 (Feb. 5, 2014).

(Continued)

*Primary Examiner* — Sameh Tawfik
(74) *Attorney, Agent, or Firm* — Thompson Hine LLP

(57) ABSTRACT

Transforming machines for changing a strip of unopened bag precursors into open bag precursors are disclosed that include a drive motor, a separation station, a sensor electrically connected to a controller that is electrically connected to components of the separation station. The separation station includes a first roller, a separation roller driven by the drive motor, and a pressure device having an actuator selectively activating the pressure device to apply pressure to the strip of unopened bag precursors passing over the first roller. In operation, the controller, based on a signal from the sensor, determines when perforations are located in a gap between the pressure device and the separation roller and at that time signals the actuator to activate the pressure device, with the drive motor driving the separation roller, thereby separating the perforations in a first film layer, but not the perforations in a second film layer.

14 Claims, 11 Drawing Sheets

(51) Int. Cl.
  *B65B 57/02* (2006.01)
  *B31B 1/00* (2006.01)
  *B32B 1/00* (2006.01)
  *B31B 23/00* (2006.01)

(52) U.S. Cl.
  CPC ........ *B31B 2237/10* (2013.01); *B65B 69/0033* (2013.01); *Y10T 428/1334* (2015.01)

(56) References Cited

U.S. PATENT DOCUMENTS

| | | |
|---|---|---|
| 4,023,470 A | 5/1977 | van der Meulen |
| 4,284,221 A | 8/1981 | Nagel et al. |
| 4,336,681 A | 6/1982 | Onishi |
| 4,369,613 A * | 1/1983 | Gess ............................. 53/553 |
| 4,688,708 A | 8/1987 | Irvine et al. |
| 4,899,520 A | 2/1990 | Lerner et al. |
| 5,041,070 A * | 8/1991 | Blaser ............................. 493/14 |
| 5,172,537 A | 12/1992 | Wetter et al. |
| 5,470,300 A * | 11/1995 | Terranova ...................... 493/11 |
| 5,693,163 A * | 12/1997 | Hoover et al. ................ 156/147 |
| 5,836,498 A | 11/1998 | Turek |
| 5,862,968 A | 1/1999 | Traise |
| 6,035,611 A | 3/2000 | Lerner |
| 6,135,281 A | 10/2000 | Simhaee |
| 6,178,725 B1 | 1/2001 | Sperry et al. |
| 6,199,349 B1 * | 3/2001 | Lerner ............................ 53/472 |
| 6,234,943 B1 | 5/2001 | Copin |
| 6,379,292 B1 | 4/2002 | Simhaee |
| 6,470,648 B1 * | 10/2002 | Baker ............................. 53/411 |
| 6,543,201 B2 * | 4/2003 | Cronauer et al. ............ 53/131.5 |
| 6,742,317 B2 | 6/2004 | Cronauer et al. |
| 6,945,695 B2 * | 9/2005 | Rabiea ........................... 383/37 |
| 7,722,517 B2 | 5/2010 | Chen |
| 7,836,670 B2 | 11/2010 | Cerf |
| 7,874,509 B2 | 1/2011 | Kenney |
| 8,307,862 B2 | 11/2012 | Williamson |
| 2002/0117528 A1 | 8/2002 | Turek |
| 2003/0046901 A1 | 3/2003 | Cronauer et al. |
| 2003/0230052 A1 | 12/2003 | Rabiea |
| 2006/0194684 A1 | 8/2006 | Tan |
| 2009/0057478 A1 | 3/2009 | Conner |
| 2009/0094946 A1 * | 4/2009 | Trinko ............................ 53/456 |
| 2011/0124479 A1 | 5/2011 | Duwendag et al. |
| 2012/0073246 A1 | 3/2012 | Riccardi et al. |

FOREIGN PATENT DOCUMENTS

| | | |
|---|---|---|
| EP | 0449497 | 10/1991 |
| EP | 1106338 | 6/2001 |
| EP | 1667914 | 6/2006 |
| EP | 2230067 | 6/2013 |
| WO | 2005/032946 | 4/2005 |

OTHER PUBLICATIONS

Office Action issued Apr. 18, 2014 regarding U.S. Appl. No. 13/963,431.

Notice of Allowance issued Aug. 8, 2014 regarding U.S. Appl. No. 13/963,431.

* cited by examiner

METHOD AND APPARATUS FOR OPENING BAGS WHILE MAINTAINING A CONTINUOUS STRIP OF BAG PRECURSORS

RELATED APPLICATIONS

This application is a continuation-in-part of U.S. application Ser. No. 13/963,431, filed Aug. 9, 2013, which claims the benefit of U.S. Provisional Application No. 61/691,288, filed Aug. 21, 2012, the entire contents of which are incorporated herein by reference in their entirety.

TECHNICAL FIELD

The present invention relates generally to bags for retaining a product, and more specifically to a method and apparatus for changing a strip of tube stock, typically in the form of a roll thereof, into sealed bag precursors of selectively variable length and then into open bags prior to being continuously fed into a bag filling machine for sealing a product in individual bags.

BACKGROUND

It is well known in the art to supply a roll of pre-opened bags for sealing a product in a bag with a bag filling machine, such as disclosed in U.S. Pat. No. 6,742,317.

However, a roll of pre-opened bags has a diameter, which is about twice the size of a roll of sealed film without pre-openings in the bags. Air trapped in the pre-opened bags makes the roll twice the size of a roll of sealed film. The cost of a roll of pre-opened bags compared to a roll of unopened bags is about twice the cost.

The pre-opened bags are created by forming end perforations in the two layers of the film and separating the end perforations in one of the layers in a secondary operation to open the bags and rewinding the open bags on to a core to form a roll with the bags oriented in the proper direction for feeding into a bag filling machine. This additional step of rewinding the open bags requires additional time in the manufacturing process and as such is an added cost.

Moreover, the pre-opened bags are all a standard size per roll, which to change the size of the bag requires changing the roll feeding into the machine. There is a need to be able to change the size of the bag on demand without changing the roll.

Accordingly, there is a clearly felt need in the art for a method and apparatus for making open bags in a manner that reduces the cost of the rolls of material and increases productivity of a bag sealing operation without changing roll to change bag size and without changing the roll as often because more bags are present per same diameter roll.

SUMMARY

The disclosed roll of tube stock and the transforming or bag opening machines meet this long felt need with many cost effective advantages. The transforming machines for changing a strip of unopened bag precursors into a strip of open bag precursors include a drive motor, a separation station, a sensor electrically connected to a controller that is electrically connected to at least one component of the separation station. The separation station includes a first roller positioned to contact the strip of unopened bag precursors, a separation roller rotatably driven by the drive motor and positioned relative to the first roller to squeeze a continuous strip of bag precursors therebetween, and a pressure device having an actuator selectively activating the pressure device to apply pressure to the continuous strip of unopened bag precursors as the continuous strip of unopened bag precursors passes over the first roller. The pressure device is positioned relative to the separation roller to define a gap therebetween. In operation, the controller, based on one or more signals from the sensor, determines when perforations in one perforated bag precursor of the continuous strip is located in the gap between the pressure device and the separation roller and at that point in time signals the actuator to activate the pressure device, while the drive motor continues to drive the rotation of the separation roller, thereby separating the perforations in a first film layer, but not the perforations in a second film layer, of the continuous strip of bag precursors.

The transforming machine may include a perforation-seal station upstream of the separation station. The strip of bag precursors are formed from tube stock as it passes through the perforation-seal station. The controller is also electrically connected to the perforation seal-station and signals the perforation-seal station to perforate and seal the tube stock after a pre-selected length of tube stock has passed therethrough.

In one embodiment, the controller is adjustable by a user to any one of a plurality of different pre-selected lengths of tube stock. The controller may be a programmable logic controller electrically connected to an encoder as the sensor. The encoder send pulses to the programmable logic controller regarding the length of tube stock passing into the transforming machine. The programmable logic controller is adjustable by the user for lengths of tube stock corresponding to ten counts per inch up to ninety-nine counts per inch.

In one embodiment, the sealing member is a sealing wire and the perforation member is a blade, both of which are attached to a linearly activated arm. In one embodiment, the pressure device includes a friction bar and a pneumatic actuator.

In another aspect, methods for changing the tube stock into a continuous strip of sealed bag precursors and then into a continuous strip of open bag precursors are disclosed. In one method, tube stock and the transforming machine disclosed herein having a perforation-seal station are provided. The method includes feeding the tube stock into the perforation-seal station, activating the perforation-seal station thereby forming a transverse seal and a transverse perforation in the tube stock and changing the tube stock into a continuous strip of sealed bag precursors, feeding the continuous strip of sealed bag precursors into the separation station in a position where the transverse perforation of one bag precursor is within the gap between the separation roller and the pressure device, and activating the pressure device thereby separating the perforations in a first film layer, but not the perforations in a second film layer, of the continuous strip of sealed bag precursors and changing the continuous strip of sealed bag precursors into a continuous strip of open bags.

The method may also include dispensing the continuous strip of open bags into a bag filling machine in a continuous process.

DETAILED DESCRIPTION

Figure 1:
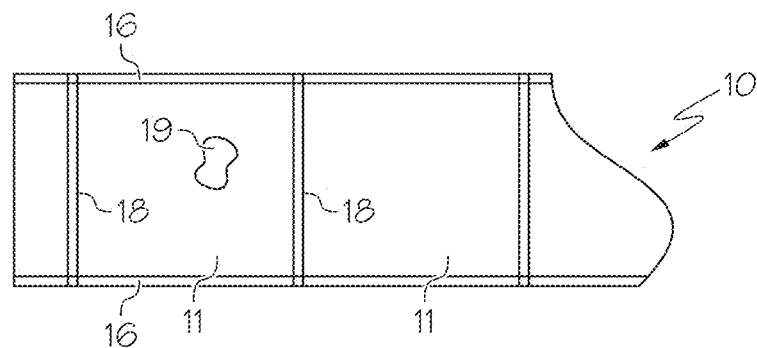
FIG. 1 is a top plan view of a strip of a plurality of bag precursors, having opposing machine direction edge seals.

The following detailed description will illustrate the general principles of the invention, examples of which are additionally illustrated in the accompanying drawings. In the drawings, like reference numbers indicate identical or functionally similar elements.

With reference now to the drawings, and particularly to FIG. 1, there is shown a top view of a strip 10 of a plurality of bag precursors 11, having opposing machine direction edge seals 16 (also called lengthwise edges herein) and a plurality of transverse seals 18 (also called end seals herein). In this embodiment, each bag precursor 11 has four edges defined by the machine direction edge seals and two transverse seals 18 joining a first film layer 12 to a second film layer 14 (best seen in FIG. 4) and defining a cavity 19 therebetween. Cavity 19 is empty in this embodiment such that substantially no air is present between the first film layer 12 and the second film layer 14 to maximize the amount of the strip 10 that can be stored on a roll, i.e., the number of bag precursors 11 on a roll, such as roll 23 in FIG. 5.

Figure 2:
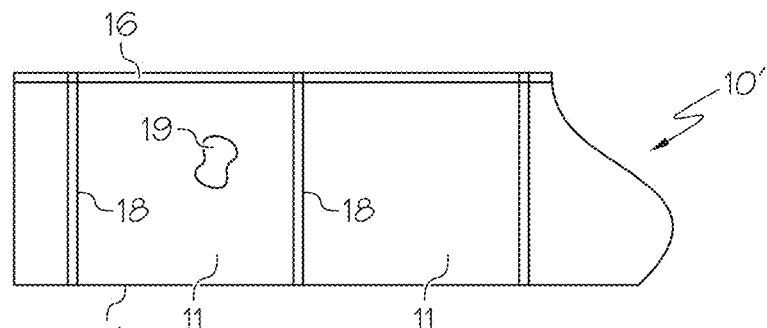
FIG. 2 is a top plan view of a strip of a plurality of sealed bag precursors, having one machine direction edge seal and one machine direction folded edge.

FIG. 2 is an another embodiment of a strip, generally designated by the reference number 10', of a plurality of bag precursors 11. Here, the strip 10' only includes three seals because one machine direction edge is a fold 17 in a continuous piece of film that after folding defines the first film layer 12 and the second film layer 14 (best seen in FIG. 4). In this embodiment, each bag precursor 11 includes a machine direction edge seal 16 opposing the fold edge 17 and has two transverse seals 18 joining the first film layer 12 to the second film layer 14 and defining a cavity 19 therebetween. Cavity 19 is empty such that substantially no air is present between the first film layer 12 and the second film layer 14 to maximize the amount of the strip 10 that can be stored on a roll, such as roll 23 in FIG. 5.

Figure 3:
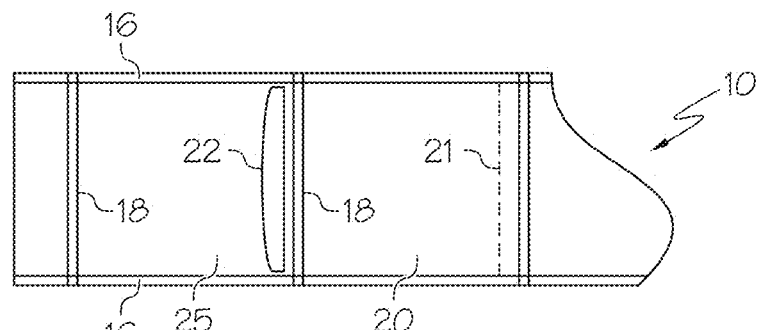
FIG. 3 is a top view of the bag strip of FIG. 1 after a perforation process and an opening process.

With reference to FIG. 3, the strip 10 from FIG. 1 is shown after end perforation 21 is formed in one of the bag precursors thereby forming a perforated bag precursor 20, and after one such end perforation has been opened thereby forming a bag opening 22. The strips 10, 10' are first made as set forth above to have a plurality of seals 16, 18 to define a continuous strip of bag precursors 11 and through a method transforms the bag precursors into open bags 25. The method includes forming end perforations 21 in the first and second film layers 12, 14; and separating the end perforations 21 to form bag openings 22 in a transforming machine 24.

Figure 5:
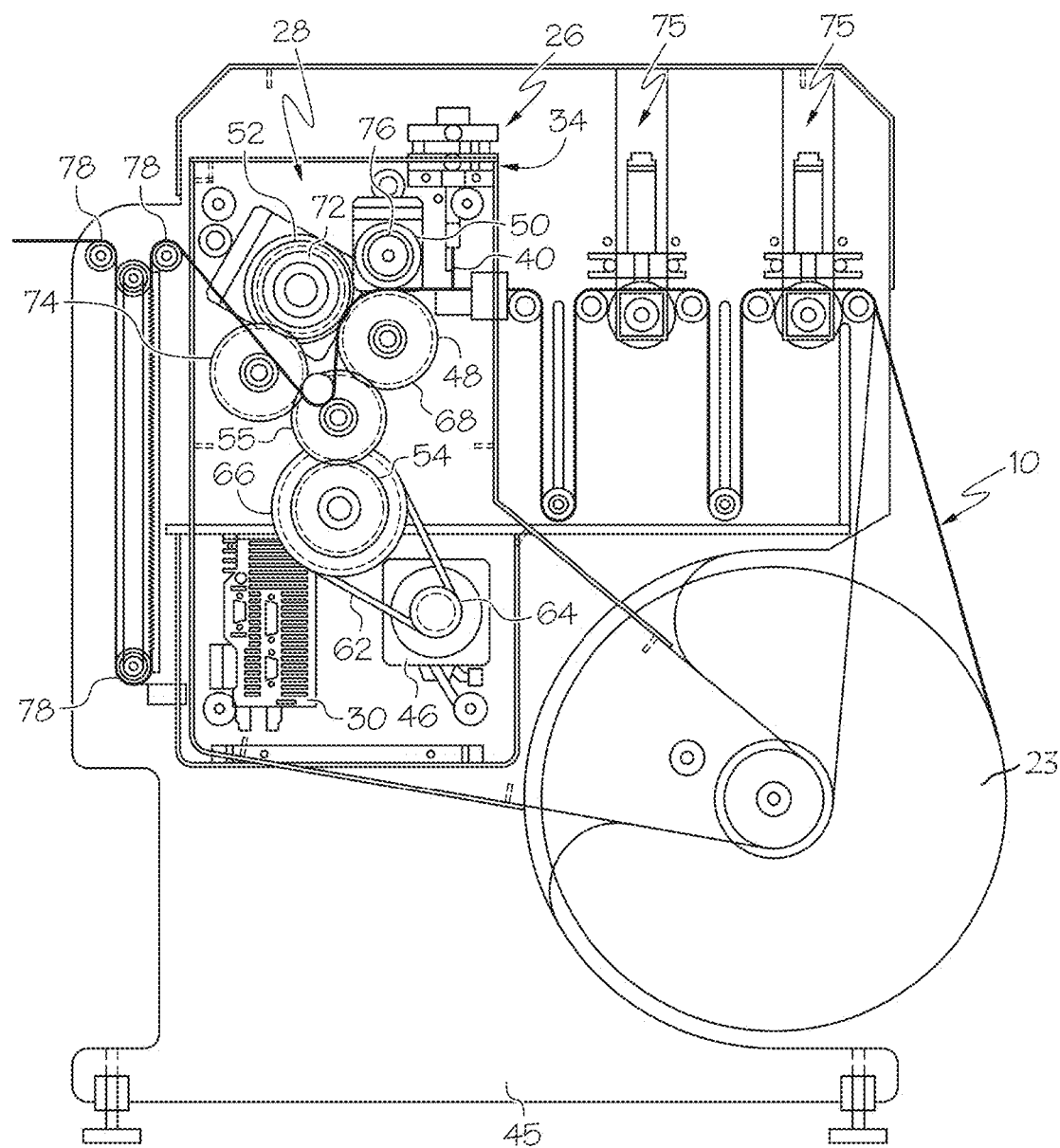
FIG. 5 is a side cross sectional view of a bag opening or transforming machine.

A first embodiment of the transforming machine 24 is illustrated in FIGS. 5-9. As seen in FIG. 5 and the enlarged portion thereof shown in FIG. 6, the transforming machine 24 includes a perforation station 26, a separation station 28, and at least one piercing station 75. The perforation station 26 forms the plurality of end perforations 21 in the first and second film layers 12, 14 of the bag strip 10, or more specifically into a bag precursor 11 (FIGS. 1-3). The separation station 28 opens the bag opening 22 in the perforated bag precursor 20. A piercing station 75 pierces holes in the bag strip, or more specifically into a bag precursor. The embodiment in FIG. 5 includes two piercing stations 75 and the embodiment in FIG. 11 includes one piercing station 75. Additional piercing stations 76 may optionally be added in the transforming machine 24' or connected thereto as needed as represented by the dashed box in FIG. 11.

Figure 6:
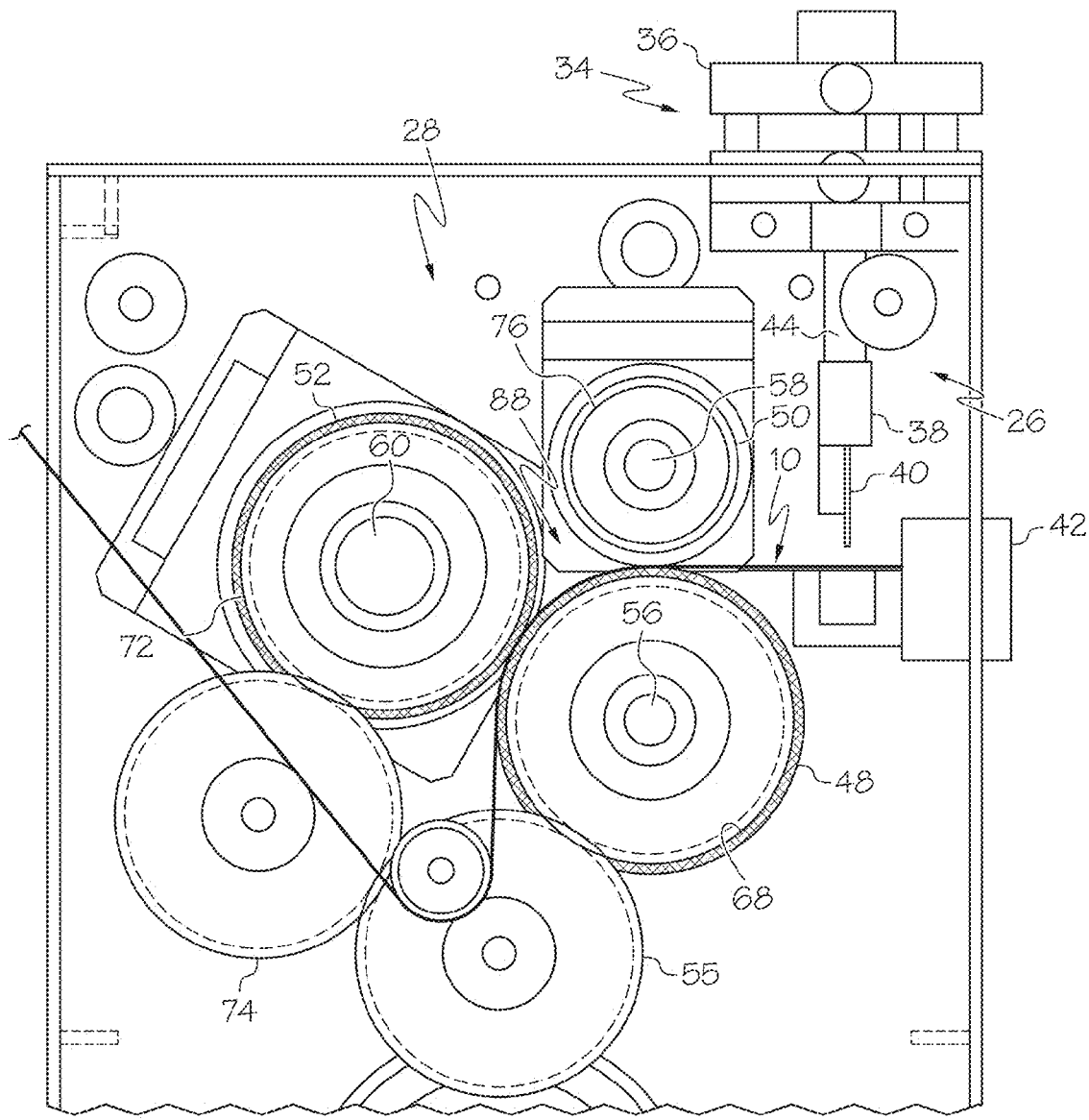
FIG. 6 is an enlarged side cross sectional view of a perforation station and a separation station of the transforming machine of FIG. 5.

The perforation station 26 in FIGS. 5 and 6 may include a vertically actuated perforation member 34 or a rotary perforation member (not shown). The vertically actuated perforation member 34 preferably includes at least one actuation device 36, a blade holder 38, a perforation blade 40 and an electronic eye 42 (label in FIG. 6). The actuation device 36 is preferably a pneumatic cylinder, but other suitable actuation devices may also be used. The actuation device 36 includes an actuation rod 44 to which the blade holder 38 is attached. The perforation blade 40 is typically removably attachable to the blade holder 38. The electronic eye 42 senses the location of the end seals 18.

The transforming machine 24 also includes an electronic controller 30. The electronic controller 30 receives an electrical signal from the electronic eye 42 and actuates the at least one actuation device 36 according to a parameter, such as a period of time programmed into the electronic controller 30. The electronic controller 30 also momentarily stops the rotation of a drive motor 46, which stops the forward movement of the strip 10 or 10', such that the end perforations 21 are perpendicular to a length of the bag strip 10, 10', i.e., are transverse to the machine direction.

The separation station 28 of FIGS. 5-6 separates the plurality of end perforations 21 in the first film layer 12 of the bag strip 10 to form the plurality of bag openings 22. The separation station 28 in this embodiment includes a base frame 45, a main drive roller 48, a pressure roller 50, at least one separation roller 52, a first drive gear 54 a second drive gear 55 and the drive motor 46. The main drive roller 48 includes a main shaft 56; the pressure roller 50 includes a pressure shaft 58; and the one or more separation rollers 52 are retained on a separation shaft 60. The main shaft 56, the pressure shaft 58 and the separation shaft 60 are rotatably retained in the base frame 45 and the main shaft 56 and the separation shaft 60 are driven by drive motor 46.

The drive motor 46 as seen in FIG. 5 drives the second drive gear 55 through an endless transmission element 62 (such as a belt or chain), a drive pulley 64, a driven pulley 66 and the first drive gear 54. The first drive gear 54 is attached to the driven pulley 66 being driven by the endless transmission element 62 for rotation therewith. The first drive gear 54 drives the second drive gear 55 and the second drive gear 55 drives the main drive gear 68 of the main drive roller 48. A separation drive gear 72 is attached to the separation shaft 60 of the separation roller 52. The second drive gear 55 also drives the separation drive gear 72 (and hence the separation roller 52) through a separation idler gear 74.

Still referring to FIGS. 5-6, the pressure shaft 58 includes an electric brake 76 for momentarily stopping the rotation of the pressure shaft 58 and hence the pressure roller 50. The electronic controller 30 activates the electric brake 76 when the end perforations 21 are located in a gap defined between the pressure roller 50 and the one or more separation rollers 52.

Figure 7:
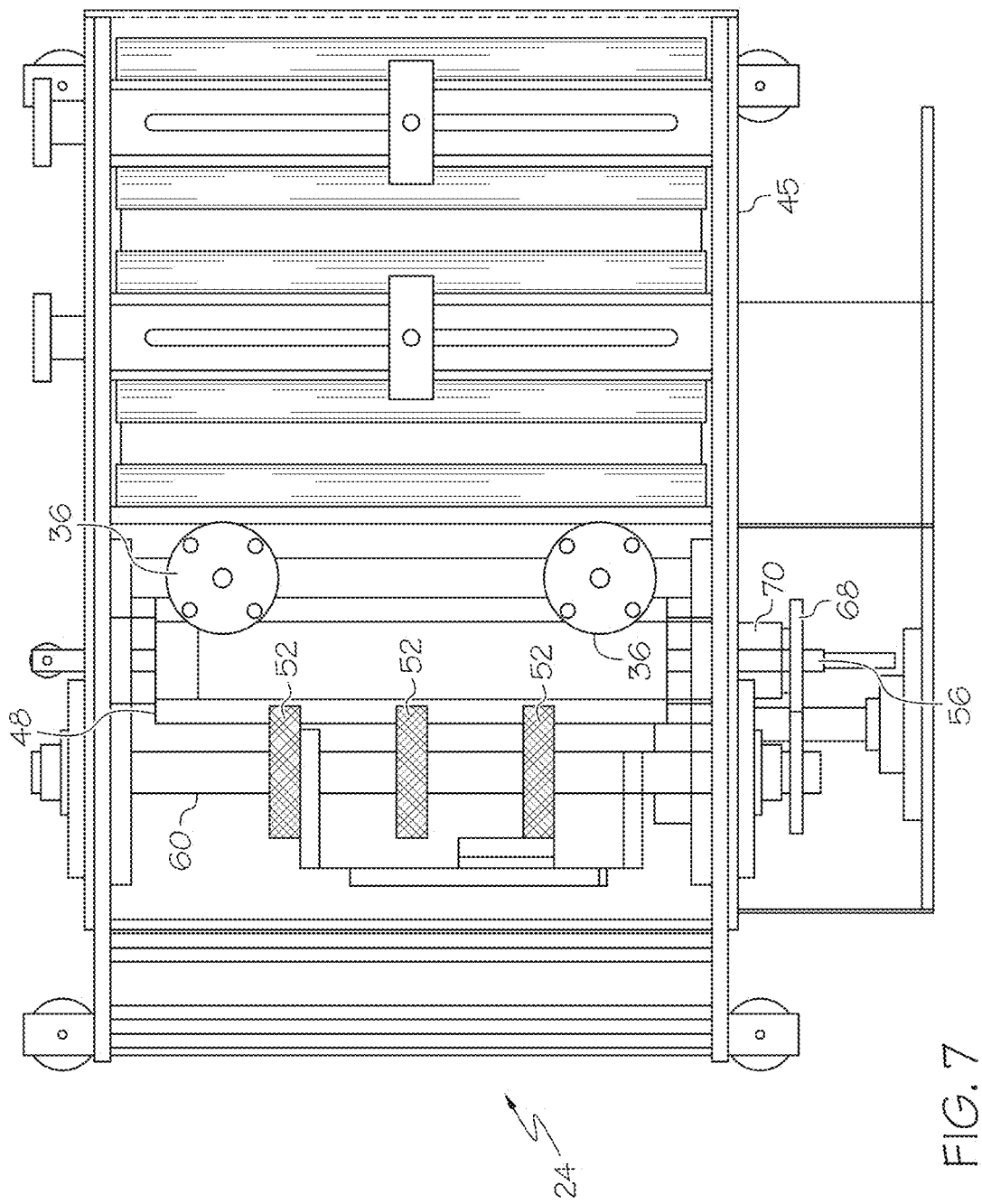
FIG. 7 is a top view of the transforming machine of FIG. 5.
Figure 9:
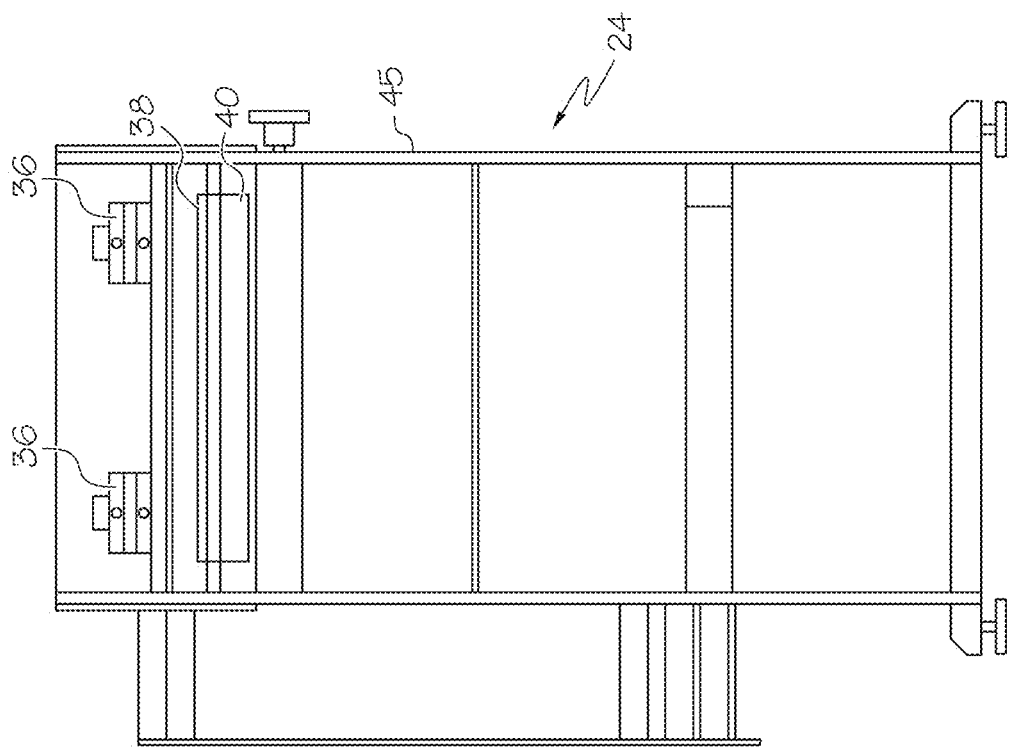
FIG. 9 is a rear view of the transforming machine of FIG. 5.
Figure 8:
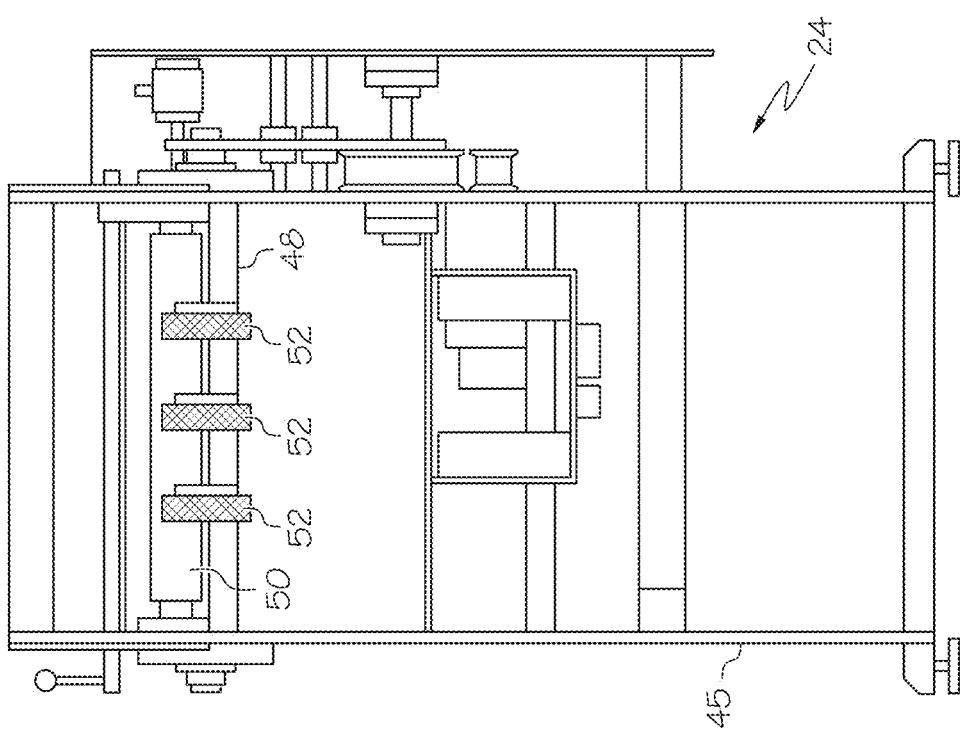
FIG. 8 is a front view of the transforming machine of FIG. 5.

Referring now to FIG. 7, a main drive gear 68 is attached to a main clutch 70 (shown in FIG. 7). The main clutch 70 is retained on the main shaft 56 which supports the main drive roller 48. In this view of the transforming machine 24 and in FIG. 9, three separation rollers 52 are visible. These drawings are merely one example embodiment and it is understood that there can be one, two, three or more separation rollers 52 on the separation shaft 60. FIG. 7 and FIG. 8 also illustrate that there may be more than one actuation device 36 for actuating the perforation member 34. While two actuation devices 36 are shown, the transforming machine 24 is not limited thereto.

Figure 4:
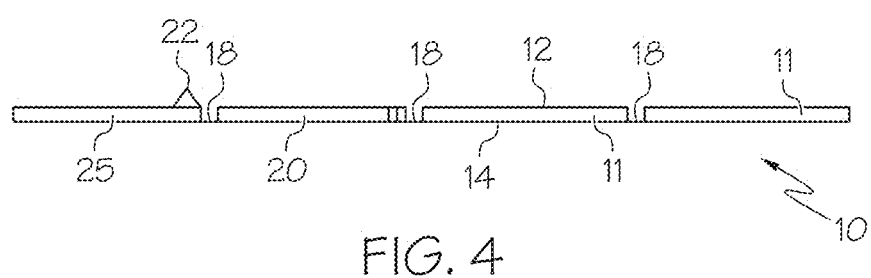
FIG. 4 is a side view of a portion of the bag strip of FIG. 3.

The unopened, perforated bag precursors 20 on the bag strip 10, illustrated in FIGS. 3 and 4, are perforated and opened in the following manner using the transforming machine 24 or 24' of FIGS. 5 and 11. The bag strip 10 is first routed through the perforation station 26. The perforation blade 40 forms the end perforations 21 in the first and second film layers 12, 14 of the bag strip 10. If the vertically actuated perforation member 34 is used to create the end perforations, the drive motor 46 is stopped momentarily to create the end perforation 21. If a rotary perforation member is used, the drive motor 46 is not stopped.

The bag strip 10 is then routed through the separation station 28. The bag strip 10 is squeezed between the pressure roller 50 and the main drive roller 48. The bag strip 10 is also squeezed between the separation roller 52 (or a plurality thereof) and the main drive roller 48. Each unopened, perforated bag precursor 20 is opened when the main clutch 70 (shown in FIG. 7) is disengaged momentarily from the main drive gear 68; the pressure roller 50 is braked with the electric brake 76; and when the end perforations 21 are located in a gap 88 between the pressure roller 50 and the at least one separation roller 52. Travel of the first film layer 12 adjacent the pressure roller 50 will stop as a result of the electric brake 76 and the first film layer 12 adjacent the separator roller 52 will keep traveling with the result that the end perforations 32 in the first film layer 32 are torn, producing a bag opening 22 in the bag 20. The bag strip 10 is finally taken-up by a plurality of take-up rollers 78.

The location of the bag strip 10 in the gap 88 between the pressure roller 50 and the separation roller 52 may be known by an electronic controller 30. The electronic controller 30 calculates the position of the end perforations 21 by sensing the end seals 18 and knowing the speed of the bag strip 10 through the machine 24.

Figure 10:
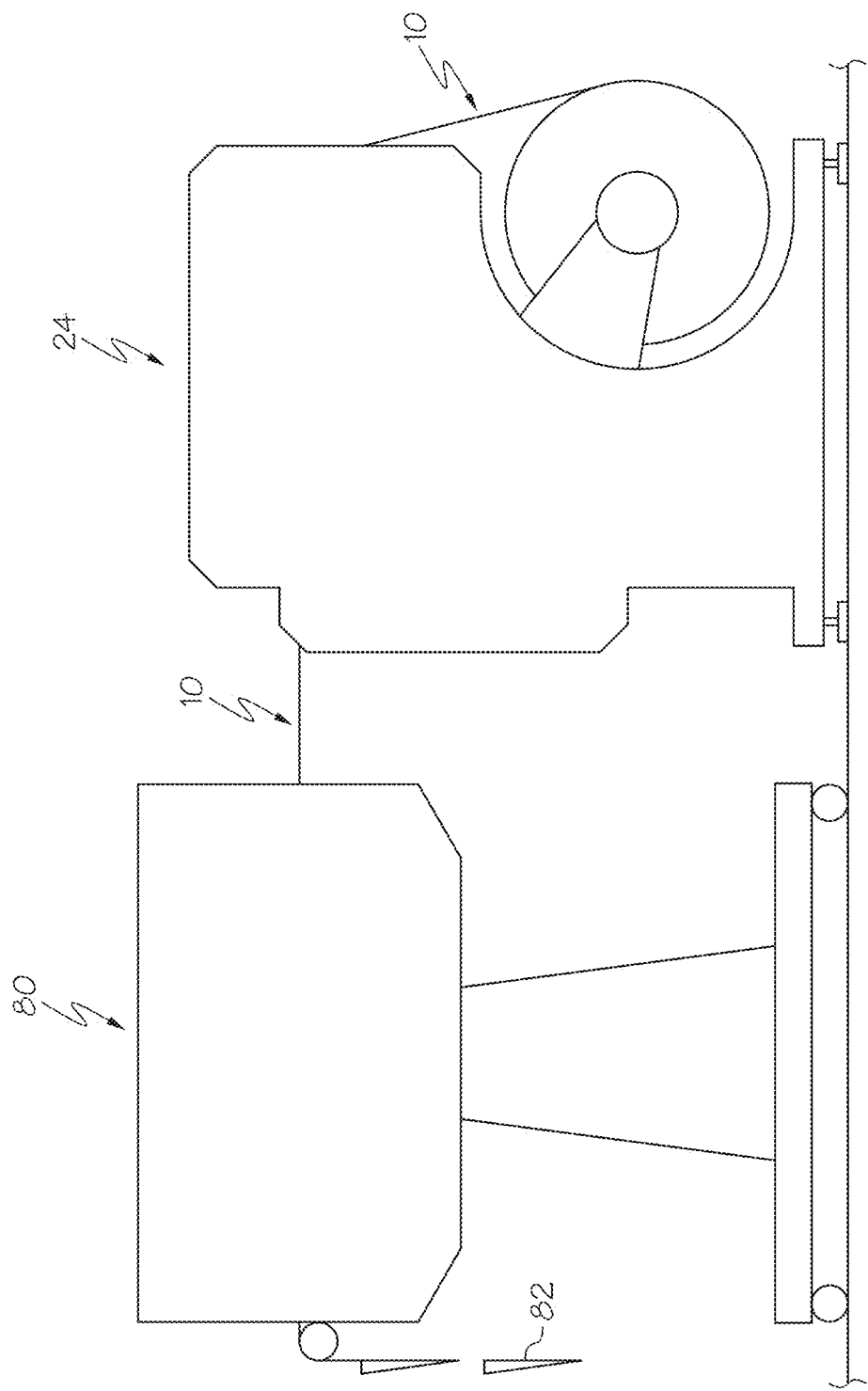
FIG. 10 is a side view of a bag opening or transforming machine feeding a bag filling and sealing machine.

With reference to FIG. 10, a bag filling machine 80 is fed with the bag strip 10 from the transforming machine 24. As seen in the figure, the strip 10 is exiting the transforming machine 24, which will have opened the bag precursors or perforated and opened the bag precursors as described above. The bag filling machine 80 may be any suitable commercially available device. A product is inserted into each bag opening 22 in the bag strip 10; the bag opening 22 is sealed; and the end perforation 21 in the second film layer 14 cut to produce a sealed bag 82.

Figure 11:
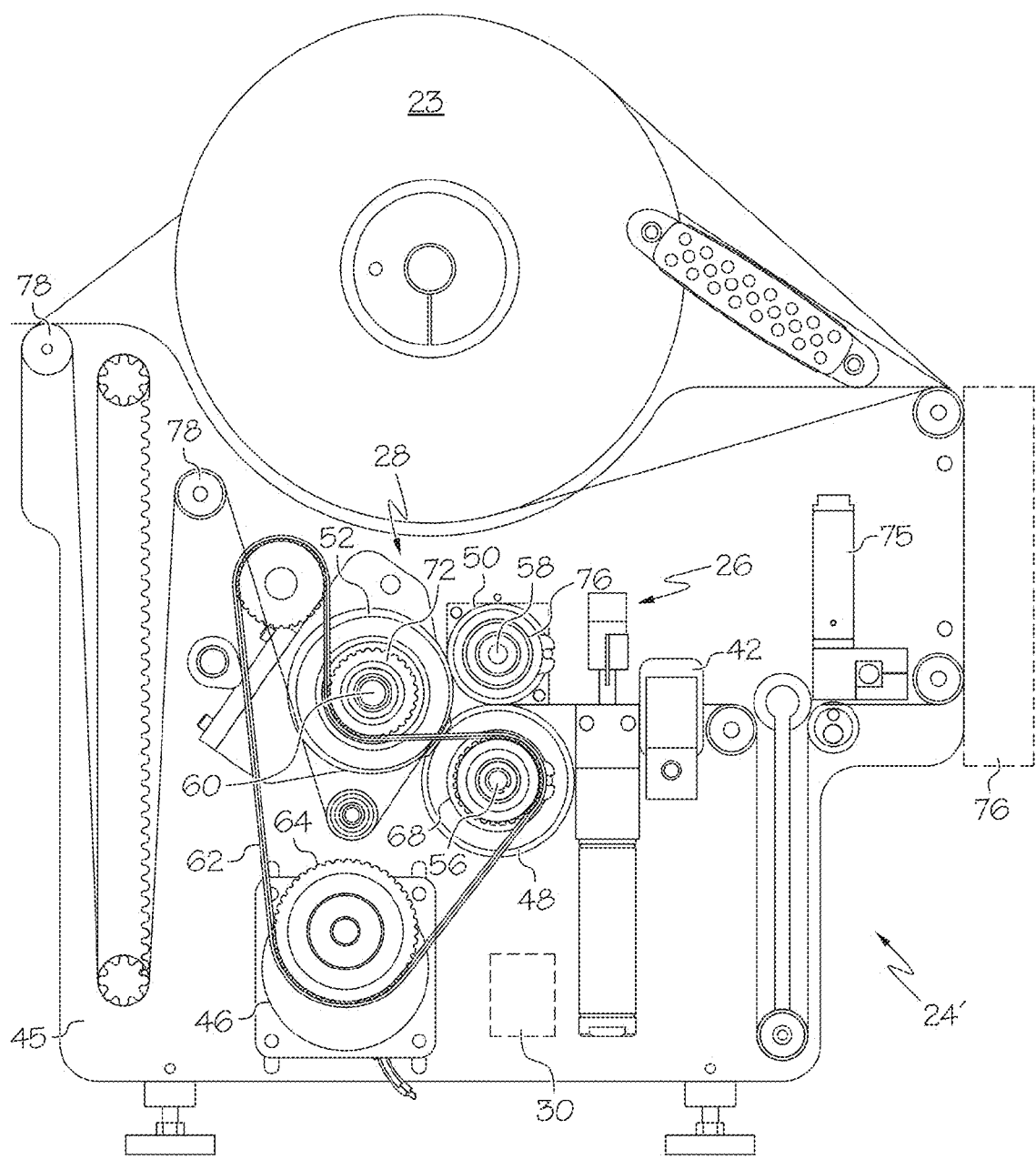
FIG. 11 is a side cross sectional view of an alternate embodiment of a bag opening or transforming machine.

Referring now to FIG. 11, an alternate embodiment of a transforming machine designated by the reference number 24' is illustrated. The transforming machine 24' includes many of the same components as the transforming machine 24 of FIGS. 5-9 and like reference numbers are used for similar components. As see in FIG. 11, the transforming machine 24 may include an optional piercing station 76, does include a piercing station 75, a perforating station 26, and a separating station 28 mounted to a base frame 45. These components of the transforming machine 24' operate as described above with respect to FIGS. 5-9. The primary difference in this embodiment is the gearing and connection of the separation station's main drive roller 48, specifically its main drive gear 68, and the separation roller 52, specifically its separation gear 72 to the drive motor 46. Here, the drive motor 46 includes a drive gear 64 having an endless transmission element 62 entrained thereabout and about a driven gear 54 and in operative connection to the main drive gear 68 and the separation drive gear 72. The main drive gear 68 is connected to a main drive shaft 56 upon which the main drive roller 48 is mounted so that the drive gear 68 can rotate the main drive shaft 56 and hence rotate the main drive roller 48. Similarly, the separation drive gear 72 is connected to a separation shaft 60 upon which the separation roller 52 (or a plurality thereof) is mounted so that the separation drive gear 72 can rotate the separation shaft 60 and hence rotate the separation roller 52. One other difference is the position of the roll 23 of bag precursors 11. Here, the roll 23 is positioned above the main body of the transforming machine 24' and is fed down and into the first station, which in FIG. 11 is the piercing station 75.

Figure 12:
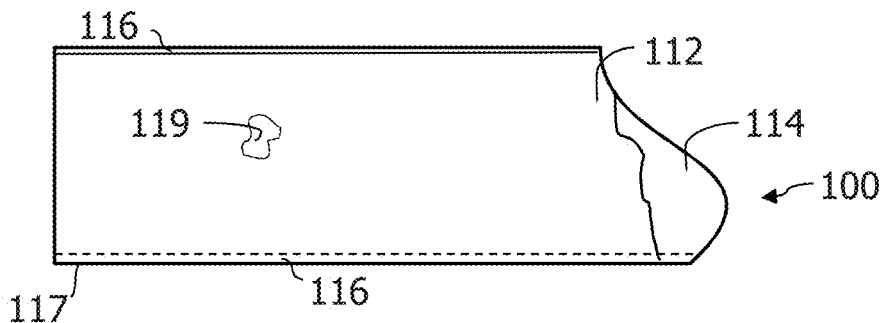
FIG. 12 is a top plan view of a strip of a tube stock for making bag precursors.

Turning now to FIG. 12, there is depicted a top view of a strip of tube stock 100 defining a cavity 119 between a first film layer 112 and a second film layer 114. The tube stock 100 may be formed of two separate sheets of film, one each being the first film layer 112 and the second film layer 114, sealed together by machine direction edge seals 116 as shown in FIG. 12. FIG. 12 also represents the option for one machine direction edge 117 to be defined by a fold in a single sheet of film with only one opposing machine direction edge seal 116. In another embodiment, not shown, the tube stock 100 may be a continuous tube with no machine direction edge seals. Cavity 119 is empty in this embodiment such that substantially no air is present between the first film layer 112 and the second film layer 114 to maximize the amount of the tube stock 100 that can be stored on a roll, such as roll 123 in FIG. 15.

Figure 13:
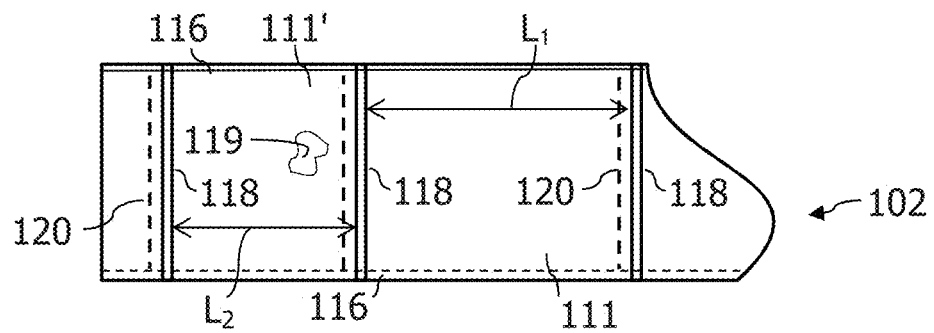
FIG. 13 is a top plan view of a strip of the tube stock after passing through a perforation-seal station to form bag precursors of different lengths.
Figure 15:
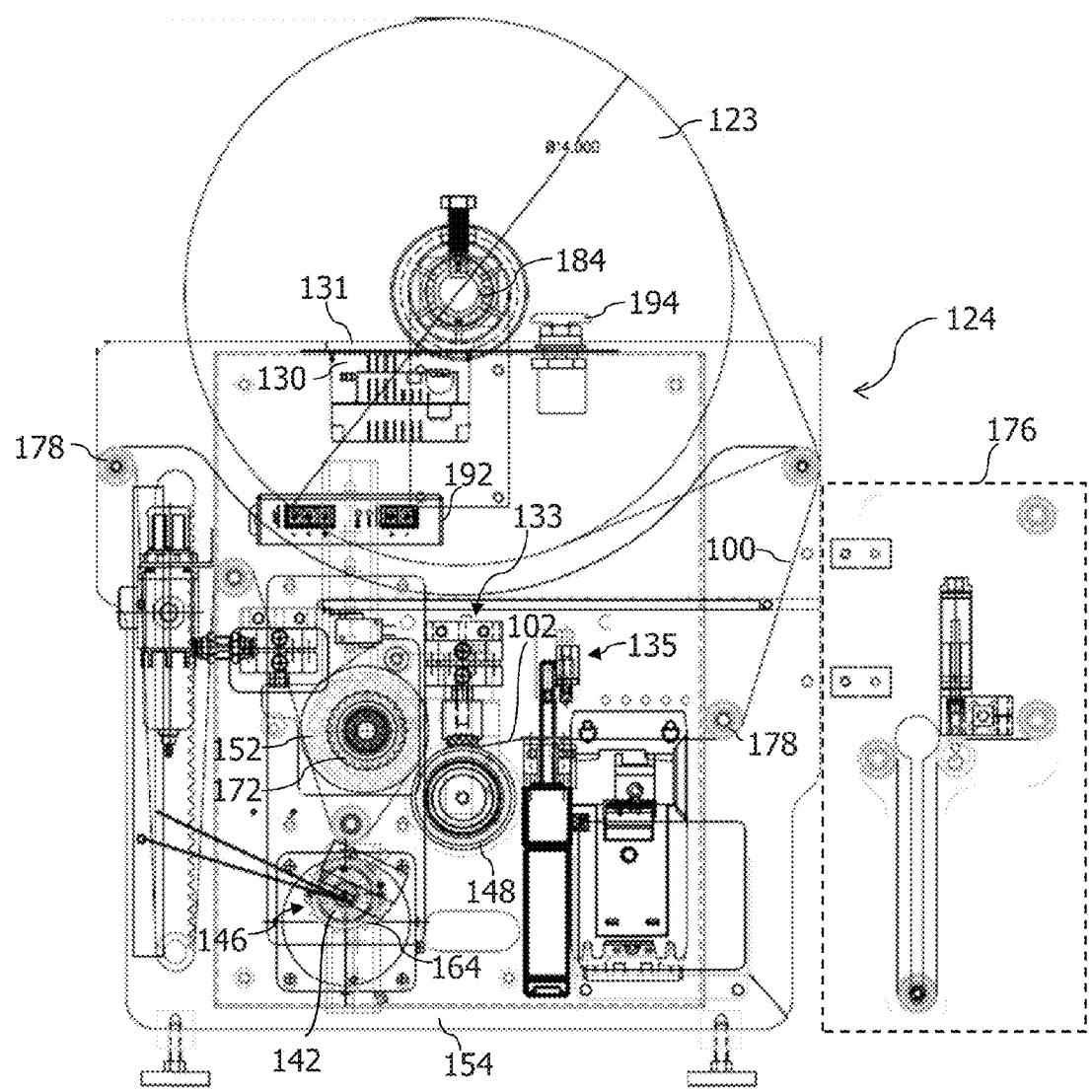
FIG. 15 is a side cross sectional view of an alternate embodiment of a bag opening or transforming machine that makes bags of different lengths without changing the roll.

The tube stock 100 is fed into a transforming machine such as machines 24, 24' if equipped with a perforation station and a seal station or a perforation-seal station 135 as disclosed in machine 124 of FIG. 15. Once the tube stock 100 passes through a machine so equipped, the tube stock 100 is converted to a continuous strip of bag precursors 102 with each bag precursor 111 having one transverse seal 118 and a transverse perforation 120 as illustrated in FIG. 13. Moreover, as shown in FIG. 13, the bag precursors 111 may have different lengths. Bag precursor 111 has a length $L_1$ and bag precursor 111' has a length $L_2$, where $L_1$ is greater than $L_2$. The length of the bag precursors 111 is adjustable without changing the roll 123 such that a continuous strip of bag precursors 102 with different lengths is possible.

Figure 14:
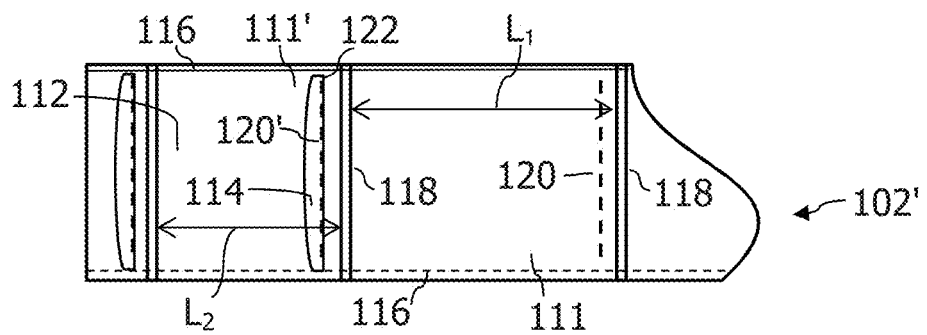
FIG. 14 is a top view of the bag precursors of FIG. 13 after an opening process was performed on one of the shorter bag precursor to form an open bag.
Figure 16:
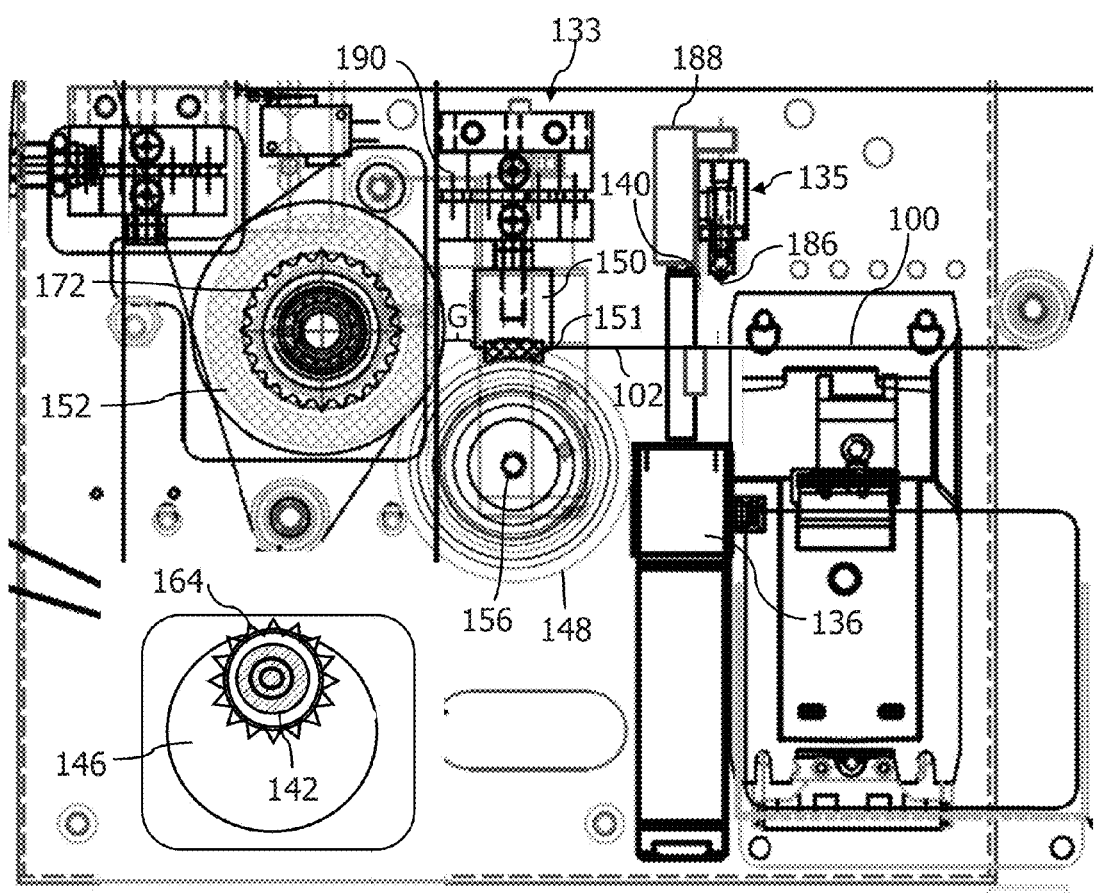
FIG. 16 is an enlarged side cross sectional view of the perforation-seal station and a separation station of the transforming machine of FIG. 15.
Figure 17:
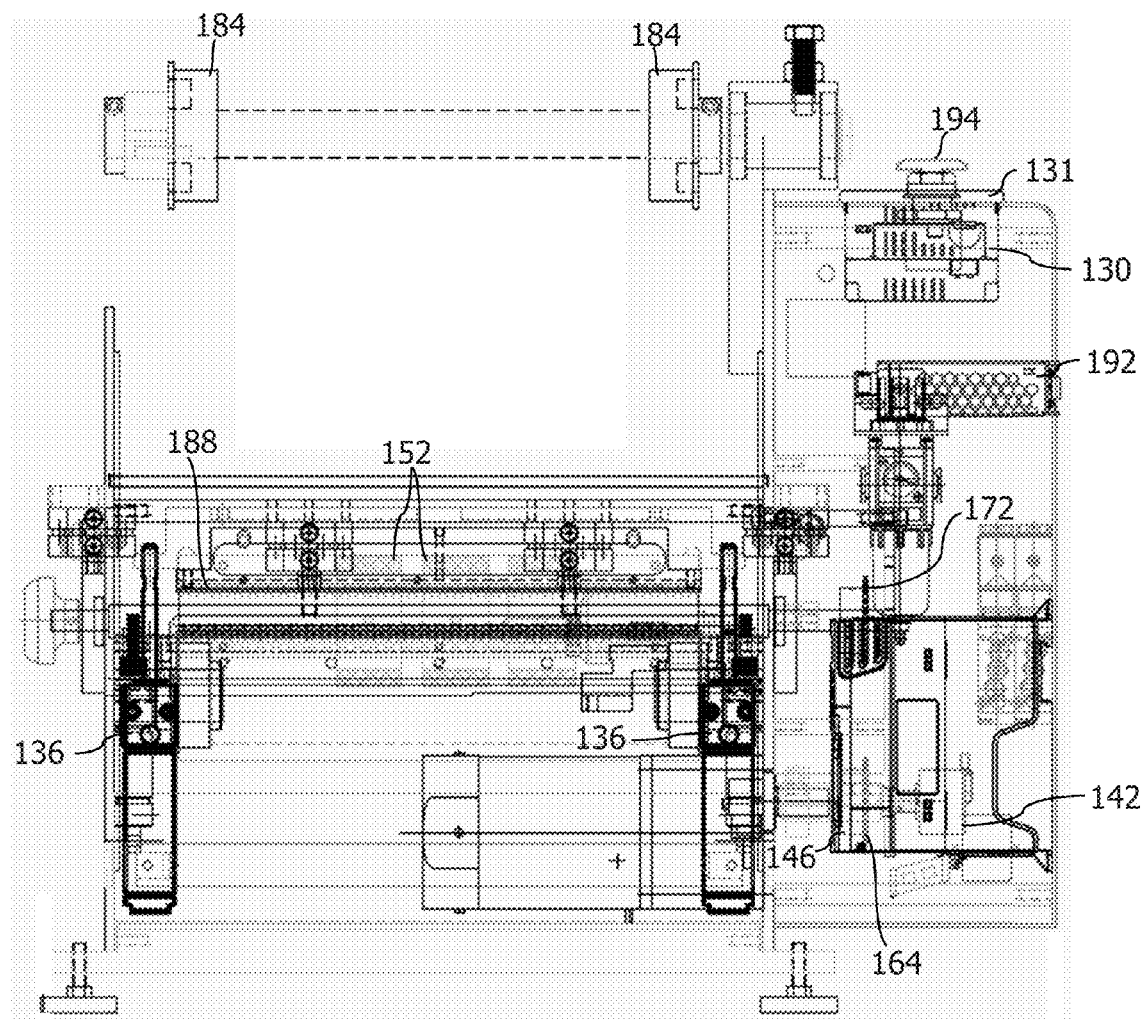
FIG. 17 is an end view of the transforming machine of FIG. 15.

The transforming machine 124, referring to FIGS. 15-17, uses a controller 130 and a sensor 142, such as an encoder, to determine a length of tube stock 100 passing into and/or through a the machine. At a pre-selected length of tube stock 100 the controller 130 activates the perforation-seal station 135 to form the transverse seal 118 and the transverse perforation 120 for a first bag precursor 111 and again activates the perforation-seal station 135 to form a transverse seal 118 and a transverse perforation 120 for a second bag precursor 111 once the pre-determined length is sensed and communicated to the controller, which is repeated continuously based on the setting of the controller 130 until such setting is changed by the user to a different preselected length. The continuous strip of bag precursors 102 (FIG. 13), formed after passing through the perforation-seal station 135 in the transforming machine 124 of FIG. 15 (or the other transforming machines so equipped), enters the separation station 133 thereof to open one perforation 120 in the first film layer 112 thereby forming a bag opening 122, without tearing the perforation 120' in the second film layer 114. Thus, the continuous strip of bag precursors 102 is now a continuous strip of open bags 102' as depicted in FIG. 14.

Referring again to FIGS. 15-17, an alternate embodiment of a transforming machine designated by the reference number 124 is illustrated. The transforming machine 124 includes many of the same components as the transforming machine 24 of FIGS. 5-9 and like reference numbers are used for similar components, but are now represented preceded by a one hundred. As shown in FIG. 15, the transforming machine 124 may include an optional piercing station 176, does include a perforation-seal station 135, a separating station 133 mounted to a base frame 145, and a support 184 for a roll of tube stock 123, which in this embodiment is positioned above the transforming machine 124, but is not limited thereto. The perforation-seal station 135 is positioned upstream of the separation station 133 and the perforation-seal station 135 forms a strip of bag precursors 102 (FIG. 13) of selectable and variable length from tube stock 100 as it passes therethrough.

The perforation-seal station 135 includes a sealing member 186 and a perforation member 140 that are activated simultaneously to form, respectively, the transverse seal 118 and the transverse perforation 120 shown in FIG. 13. In one embodiment, the sealing member 186 is a sealing wire and the perforation member 140 is a toothed blade, both of which are attached to at least one linear actuation device 136 to move the sealing member 186 and the perforation member 140 into and out of engagement with the tube stock 100. The sealing member 186 and the perforation member 140 may be mounted to or be part of an arm 188 operatively coupled to the at least one linear actuation devices 136. The linear actuation device 136 may be a pneumatic cylinder, but other suitable actuation devices may also be used.

To change the lengths of the bag precursors 111 formed by the perforation-seal station 135, the transforming machine 124 includes a controller 130 electrically signaling the perforation-seal station 135 (it is electrically connected thereto for communication therewith) to perforate and seal the tube stock 100 after a pre-selected length of the tube stock 100 has passed into the machine. The electrical signal sent from the controller 130 is based on its programmed logic, the information received from the sensor 142, and the setting of the controller 130 selected by a user. Accordingly, the controller 130 includes a user interface 131 that may include a display for communicating with the user. The user interface may be a touch screen or a key pad, but is not limited thereto. In one embodiment, the controller 130 may be a programmed logic controller. Because the controller includes programmed logic, the user can select any one of different lengths of tube stock 100 for the bag precursors 111. For example, the user may select a seven inch bag length for a plurality of bag precursors 111' and may thereafter change the setting on the controller to a ten inch bag length to make bag precursors 111 such as illustrated in FIG. 13. One major advantage to this machine is that the bag length is changeable without changing the roll of tube stock 100, which save time and hence money for the user.

The controller 130 is electrically connected to the sensor 142 and at least the sensor sends electrical signals representative of a parameter of the tube stock 100 or the continuous strip of bag precursors 102 to the controller 130. In one embodiment, the sensor 142 is an encoder that sends pulses to controller 130, which is indicative of the length of tube stock 100 passing into/through the transforming machine 124 and which the controller can covert to inches or centimeters for display to the user. The pulses of the encoder correspond to the inches of tube stock 100 and the controller may be adjustable to tube stock lengths equivalent to ten counts per inch up to ninety-nine counts per inch.

Still referring to FIGS. 15-17, the transforming machine 124 is geared differently than transforming machines 24 and 24' in that the separation station's first roller 148 is not driven by a gear in this embodiment. Instead the separation roller 152, specifically its separation gear 172, is geared to the drive motor 146 by a drive gear 164 having an endless transmission element (not shown in FIG. 15, such as a chain or belt) entrained thereabout such that the drive motor 146 drives the separation roller 152 and the separation roller 152 through its contact with the first roller 148 cause the first roller 148 to rotate. This is a more simplistic design that includes less parts thereby making the manufacturing process easier and more cost effective. Moreover, there is no clutch attached to the first roller 148 in this embodiment.

The separation station 133 in the transforming machine 124 includes a first roller 148 positioned to contact the continuous strip of bag precursors 102 (FIG. 13) after it exits the perforation-seal station 135, a separation roller 152 rotatably driven by the drive motor 146 and positioned relative to the first roller 148 to squeeze the continuous strip of bag precursors 102 therebetween, and a pressure device 150, labeled in FIG. 16, having an actuator 190 selectively activating the pressure device 150 to apply pressure to the continuous strip of bag precursors 102 as it passes over the first roller 148. The pressure device 150 is positioned relative to the separation roller 152 to define a gap G therebetween. The transforming machine 124 includes the sensor 142 and the controller 130 as described above. The controller 130 is electrically connected the actuator 190 of the pressure device 150 to signal the actuator 190 to move the pressure device 150 into and/or out of engagement with the first roller 148.

In operation, the controller 130, based on one or more signals from the sensor 142, determines when perforations in one perforated bag precursor 111 of the continuous strip is located in the gap G between the pressure device 150 and the separation roller 152 and at that point in time signals the actuator 190 to activate the pressure device 150, while the drive motor 146 continues to drive the rotation of the separation roller 152, thereby separating the perforations in a first film layer 112, but not the perforations in a second film layer 114, of the continuous strip of bag precursors 102. Thereafter, the continuous strip of bag precursors 102 is a continuous strip of open bag precursors 102' as shown in FIG. 14.

In one embodiment, the pressure device 150 includes a friction bar 151 and the actuator 190 is a pneumatic actuator.

The transforming machine 124 may include a stop or kill switch 194 electrically coupled to the drive motor 146 and/or a power supply 192 to stop the machine. The power supply 192 may convert the incoming power, such as a 100 amp service, to the requirements of the machine to power various components thereof. In one embodiment, the power supply 192 may convert 110 amps to 24 volts for the controller 130, but to a different parameter for the drive motor 146.

The transforming machine 124 of FIG. 15 is designed to feed the continuous strip of open bags precursors 102' (FIG. 14) formed therein into a bag filling machine 80 as illustrated in FIG. 10. The bag filling machine 80 may be any suitable commercially available device. A product is inserted into each bag opening 122 in the bag strip 102; the bag opening 122 is sealed; and the end perforation 120' in the second film layer 114 is cut or torn to produce an independent bag 82.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A transforming machine for changing a strip of unopened bag precursors into a strip of open bag precursors comprising:
   a drive motor;
   a separation station comprising:
      a first roller positioned to contact the strip of unopened bag precursors;
      a separation roller rotatably driven by the drive motor and positioned relative to the first roller to squeeze a continuous strip of bag precursors therebetween; and
      a pressure device having an actuator selectively activating the pressure device to apply pressure to the continuous strip of unopened bag precursors as the continuous strip of unopened bag precursors passes over the first roller;
      wherein the pressure device is positioned relative to the separation roller to define a gap therebetween;
   a sensor and a controller electrically connected to the sensor and electrically connected to the actuator of the pressure device;
   wherein the controller, based on one or more signals from the sensor, determines when perforations in one perforated bag precursor of the continuous strip is located in the gap between the pressure device and the separation roller and at that point in time signals the actuator to activate the pressure device, while the drive motor continues to drive the rotation of the separation roller, thereby separating the perforations in a first film layer, but not the perforations in a second film layer, of the continuous strip of bag precursors.

2. The transforming machine of claim 1, further comprising a perforation-seal station upstream of the separation station; and wherein the strip of bag precursors are formed from tube stock as it passes through the perforation-seal station.

3. The transforming machine of claim 2, wherein the controller is electrically connected to the perforation seal-station to signal the perflation-seal station to perforate and seal the tube stock after a pre-selected length of tube stock has passed therethrough.

4. The transforming machine of claim 3, wherein the controller is adjustable by a user to any one of a plurality of different pre-selected lengths of tube stock.

5. The transforming machine of claim 3, wherein the controller is a programmable logic controller electrically connected to an encoder; wherein the encoder send pulses to the programmable logic controller regarding the length of tube stock passing into the transforming machine.

6. The transforming machine of claim 5, wherein the programmable logic controller is adjustable by the user for lengths of tube stock corresponding to ten counts per inch up to ninety-nine counts per inch.

7. The transforming machine of claim 3, wherein the perforation-seal station includes a sealing member and a perforation member that are activated simultaneously to form a transverse perforation and a transverse seal.

8. The transforming machine of claim 7, wherein the sealing member is a sealing wire and the perforation member is a blade, both of which are attached to a linearly activated arm.

9. The transforming machine of claim 1, wherein the pressure device includes a friction bar.

10. The transforming machine of claim 9, wherein the actuator is a pneumatic actuator.

11. The transforming machine of claim 1, wherein the pressure device includes a pressure roller and the actuator is a brake.

12. The transforming machine of claim 1, further comprising an endless transmission element transmitting driving power from the motor to both the main drive roller and the separation roller.

13. The transforming machine of claim 12, wherein the endless transmission element drives a drive gear that directly drives at least one of a main drive gear mounted on a shaft of the main drive roller or a separation drive gear mounted on a shaft of the separation roller and indirectly drives the other.

14. The transforming machine of claim 1, further comprising a holder for a roll of the continuous strip of bag precursors or a roll of tube stock positioned to feed into the transforming machine.

* * * * *